United States Patent
Lien et al.

(10) Patent No.: US 11,146,137 B2
(45) Date of Patent: Oct. 12, 2021

(54) COIL INSULATION STRUCTURE FOR ROTATING MACHINE

(71) Applicant: Hiwin Mikrosystem Corp., Taichung (TW)

(72) Inventors: Chia-Siang Lien, Taichung (TW);
Cheng-Hsun Pan, Taichung (TW);
Ming-Chih Lai, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 213 days.

(21) Appl. No.: 16/429,503

(22) Filed: Jun. 3, 2019

(65) Prior Publication Data

US 2020/0381971 A1    Dec. 3, 2020

(51) Int. Cl.
*H02K 3/32*      (2006.01)
*H02K 1/14*      (2006.01)

(52) U.S. Cl.
CPC ............ *H02K 3/325* (2013.01); *H02K 1/146* (2013.01)

(58) Field of Classification Search
CPC ........ H02K 3/325; H02K 1/146; H02K 11/00; H02K 2205/00; H02K 2211/00; H02K 5/00
USPC ............................................... 26/596; 29/596
See application file for complete search history.

(56) References Cited

U.S. PATENT DOCUMENTS

| | | | |
|---|---|---|---|
| 2005/0127774 A1* | 6/2005 | Sogabe | H02K 3/345 310/215 |
| 2017/0117767 A1* | 4/2017 | Ishigami | H02K 1/146 |
| 2019/0149005 A1* | 5/2019 | Yamaguchi | H02K 3/28 310/208 |
| 2019/0280573 A1* | 9/2019 | Kim | H02K 15/066 |

\* cited by examiner

*Primary Examiner* — Burton S Mullins
*Assistant Examiner* — Riley Owen Stout
(74) *Attorney, Agent, or Firm* — Muncy, Geissler, Olds & Lowe, P.C.

(57) ABSTRACT

A coil insulation structure for a rotating machine provided in the present invention is based on a conventional insulation technology. In particular, tooth portions of an iron core in which coil windings are inserted have a straight tooth structure without a shoe portion, and a component with an insulation effect is further added at a position of an opening of a groove in which the coil winding is located, so that an insulation effect is improved, and at the same time an added insulation component is used to ensure a thickness and a size of an inner layer located at a position adjacent to an air gap of a motor when the coil winding is encapsulated, thereby improving product quality.

8 Claims, 7 Drawing Sheets

COIL INSULATION STRUCTURE FOR ROTATING MACHINE

BACKGROUND OF THE INVENTION

1. Field of the Invention

The present invention relates to an insulation technology for a rotating machine, and in particular, to a coil insulation structure for a rotating machine.

2. Description of the Related Art

A person of ordinary skill in the technical field of the present invention knows a positive correlation between magnitude of a cogging torque of a rotating machine and a size of a stator groove opening. A width of a shoe portion of a shoe stator tooth is increased to reduce a size of a stator groove opening to obtain a relatively small cogging torque. However, an excessively small stator groove opening impedes the winding of a stator winding. Therefore, only automatic winding equipment can be used to directly wind an enameled wire around a stator tooth.

In such an automatic winding technology, a sufficient operation space for winding equipment needs to be provided. Therefore, a groove space is not used optimally. In comparison, a stator tooth structure without shoes in which windings wound outside in advance are directly inserted may be used. A groove space may be used to the maximum to obtain a space filling factor higher than that of a stator tooth structure with shoes.

SUMMARY OF THE INVENTION

A main objective of the present invention is to provide a coil insulation structure for a rotating machine, so that an insulation effect can be improved and a space filling factor can be further increased.

In view of this, to achieve the foregoing objective, a coil insulation structure for a rotating machine provided in the present invention is based on a conventional insulation technology. In particular, tooth Portions of an iron core in which coil windings are inserted have a straight tooth structure without a shoe portion, and a component with an insulation effect is further added at a position of an opening of a groove in which the coil winding is located, so that an insulation effect is improved, and at the same time an added insulation component is used to ensure a size and a thickness of an inner layer located at a position adjacent to an air gap of a motor when the coil winding is encapsulated, thereby improving product quality.

For specific technical content, the coil insulation structure for a rotating machine includes an iron core, a plurality of coil windings, a plurality of first insulation members, a plurality of second insulation members, and a sealant. The iron core has an annular yoke portion, and a plurality of equally long tooth portions radially protrude inwards from an inner circumferential surface of the yoke portion, so that a groove for accommodating the coil winding is respectively formed between adjacent tooth portions. Each tooth portion is made having a structure different from that of a conventional shoe portion, so that an opening width of each groove approximates a width of a groove to facilitate insertion of the coil winding wound outside.

Each first insulation member is respectively located in each groove, and is located between each coil winding and the yoke portion and between each coil winding and each tooth portion.

Each second insulation member is respectively located on groove opening sides of the grooves, and has a side attached to a side of an adjacent coil winding.

The sealant is filled in each groove to encapsulate the coil windings on the iron core, a thickness of an inner layer of the sealant located on one side, close to a curvature center of the yoke portion, of each coil winding is determined by an individual thickness of the second insulation member.

Furthermore, each second insulation member has an insulation sheet, and two insertion sheets respectively protrude from two sides of the insulation sheet and are inserted in corresponding grooves to be located between the corresponding coil windings and groove walls. A sheet body thickness of the insulation sheet is used to determine the thickness of the inner layer.

Moreover, to increase a space filling factor and enable the inner layer to keep a substantial thickness, a sheet body thickness of the first insulation member located in the groove may be less than a sheet body thickness of the insulation sheet.

To further improve the effect of insulation, a third insulation member may be respectively added between each second insulation member and each coil winding.

In an axial direction of the yoke portion, a length of each third insulation member is greater than a height of each tooth portion, and two major-axis ends of each insulation member protrude from each tooth portion; in addition, a sheet body width between two major-axis ends of each third insulation member may also be greater than a sheet body width of the insulation sheet.

In view of the implementation of assembly and processing, before the sealant is filled for encapsulation, a radial external force is applied to each coil winding via each second insulation member, so that the other side, far away from the curvature center of the yoke portion, of each coil winding displaces towards the inner circumferential surface of the yoke portion to increase a space filling factor.

The radial external force is provided by a jig passing through the iron core.

The jig is column-shaped, and has a circumferential column surface attached to each second insulation member.

DETAILED DESCRIPTION OF THE PREFERRED EMBODIMENTS

First, referring to FIG. 1 to FIG. 5, a coil insulation structure (10) for a rotating machine provided in a first preferred embodiment of the present invention mainly includes an iron core (20), a plurality of coil windings (30), a plurality of first insulation members (40), and a plurality of second insulation members (50).

Figure 1:
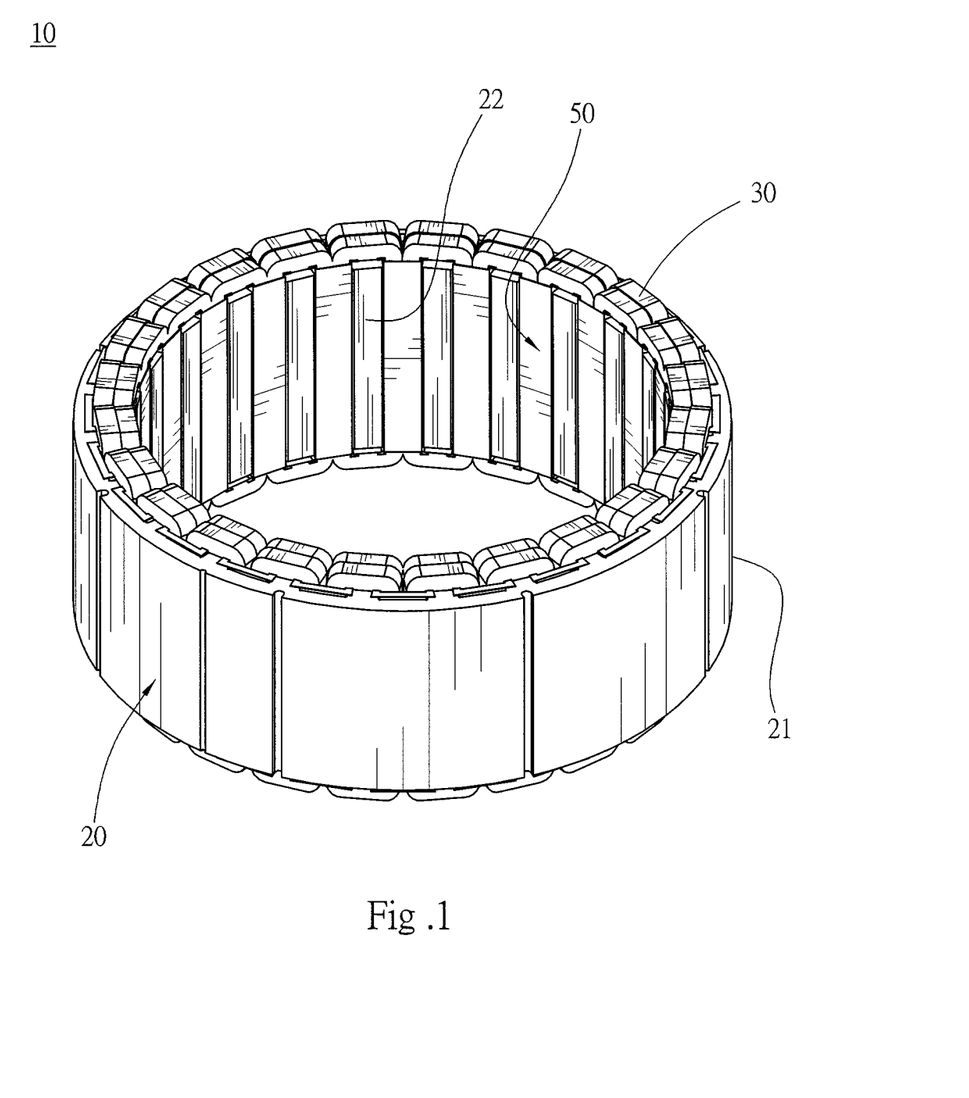
FIG. 1 is a perspective view according to a first preferred embodiment of the present invention.
Figure 2:
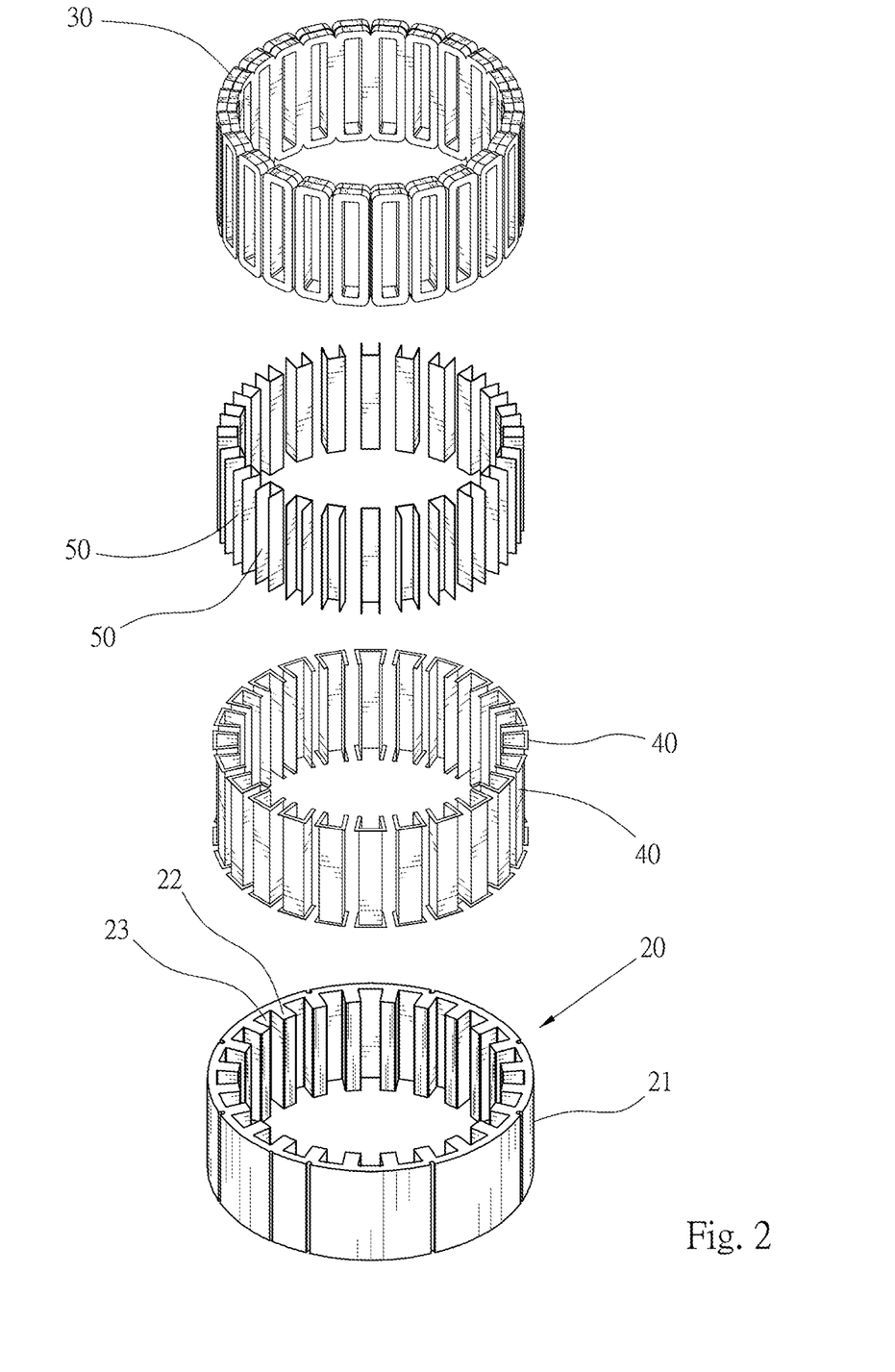
FIG. 2 is an exploded view according to the first preferred embodiment of the present invention.

The same technology of a conventional iron core formed by stacking silicon steel sheets is used for the iron core (20). The iron core (20) has a tubular yoke portion (21). A plurality of tooth portions (22) radially extend respectively from an inner circumferential surface of the yoke portion (21) towards the center by a suitable length, and structurally do not have shoe portions disposed at extending ends, so that an opening width of a groove (23) respectively formed between adjacent tooth portions (22) is close to a width of the groove. In this case, the coil windings (30) may be wound in advance outside the iron core (20) and are then respectively inserted in each tooth portion (22), and are accommodated in spaces of the grooves on two sides.

Each coil winding (30) is wound by using automated equipment or manually with an enameled wire in advance according to a size of each tooth portion (22).

Figure 3:
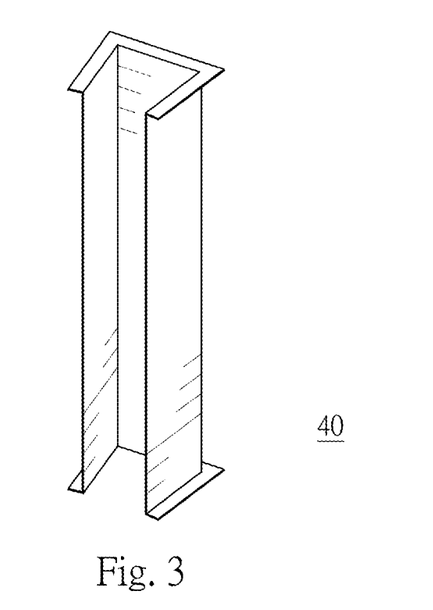
FIG. 3 is a perspective view of a first insulation member according to the first preferred embodiment of the present invention.

As shown in FIG. 3, each first insulation member (40) is a "Π"-shaped sheet body formed by cutting an insulation paper. The first insulation member (40) has a shape and a size suitable for being inserted in each groove (23) and abuts a groove bottom side of each groove (23), so that the coil winding (30) located in the groove may be insulated from the yoke portion (21) and from an adjacent tooth portion (22) by using the first insulation member (40).

Figure 4:
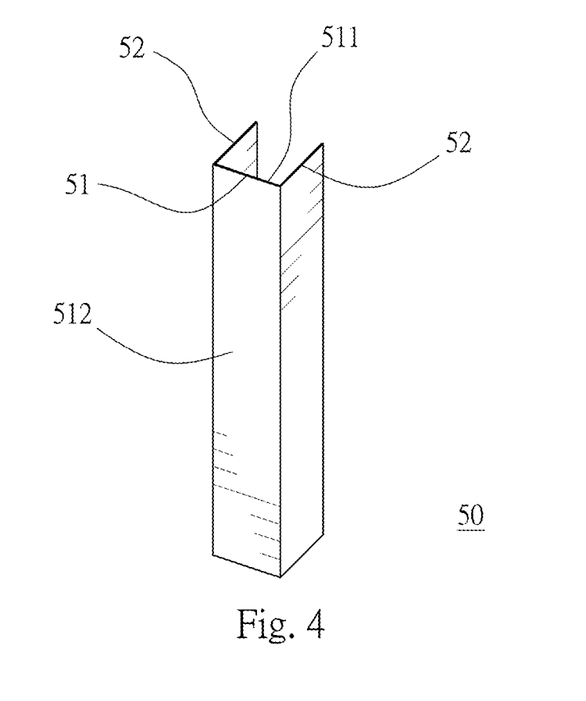
FIG. 4 is a perspective view of a second insulation member according to the first preferred embodiment of the present invention.

As shown in FIG. 4, each second insulation member (50) is also a "Π"-shaped sheet body formed by cutting an insulation paper, so that the second insulation member (50) has an rectangular insulation sheet (51) whose length is close to a height of a tooth portion and insertion sheets (52) that protrude from two minor-axis ends of the insulation sheet (51). With such a structure, each second insulation member (50) is easily inserted in a groove (23) corresponding to each insertion sheet (52), and is located between the coil winding (30) and the first insulation member (40). When the second insulation member (50) is inserted to be temporarily joined, the insulation sheet (51) closes an opening of the groove, and a one-side sheet surface (511) is attached towards the coil winding (30). Each second insulation member (50) insulates each coil winding (40) at a lateral position on which an air gap corresponding to a rotating machine is located.

Figure 5:
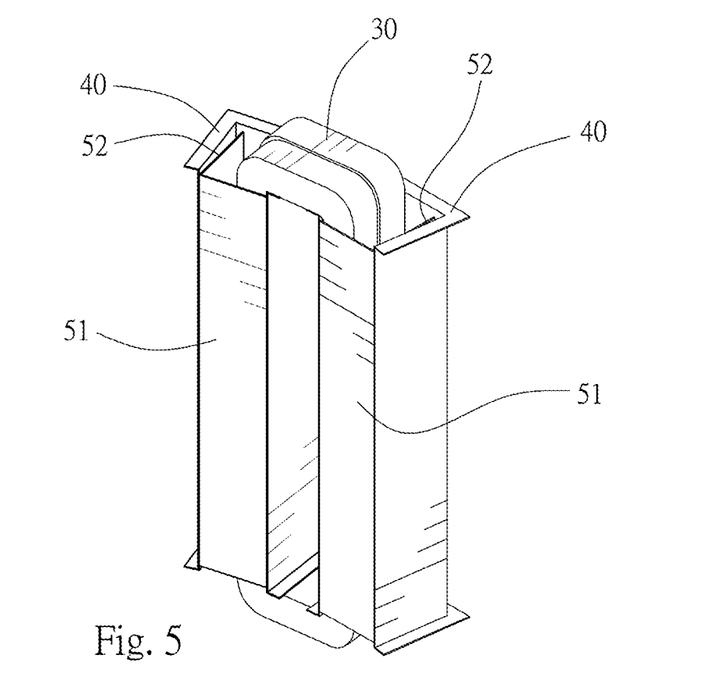
FIG. 5 is a schematic perspective view of a combination of a coil winding with a first insulation member and a second insulation member according to the first preferred embodiment of the present invention.
Figure 6:
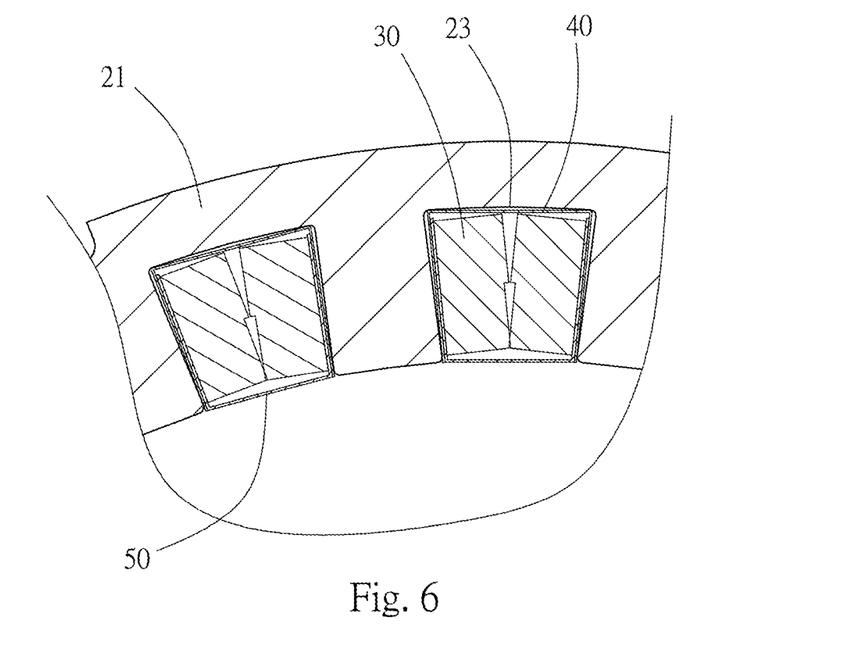
FIG. 6 is a partial sectional view according to the first preferred embodiment of the present invention, and shows a state before a jig is used to fill a sealant.
Figure 7:
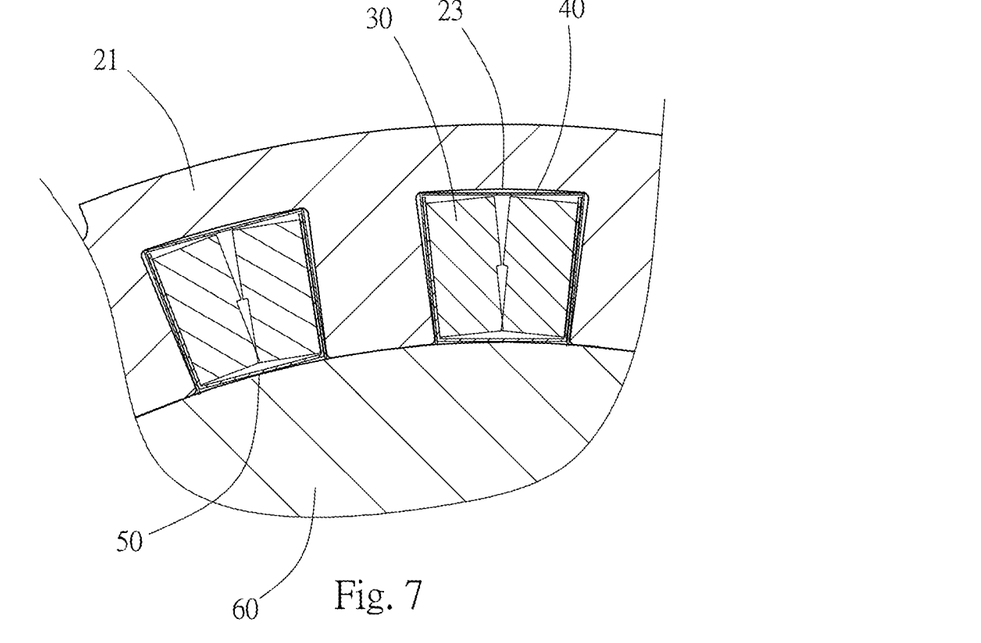
FIG. 7 is a partial sectional view according to the first preferred embodiment of the present invention, and schematically shows that a jig is inserted in an iron core and a coil winding is pushed inwards.

Referring to FIG. 5, after each coil winding (30) is inserted in the tooth portion (22) and is insulated by each first insulation member (40) and each second insulation member (50), a column-shaped jig (60) is inserted in the iron core (20), and a circumferential column surface of the jig (60) is attached to an opposite-side sheet surface (512) of each insulation sheet (51). Meanwhile, a pushing force in a radial direction is applied via each insulation sheet (51) to push each coil winding (30) towards the yoke portion (21) to be accommodated in a space of the groove to obtain a maximum space filling factor.

Figure 8:
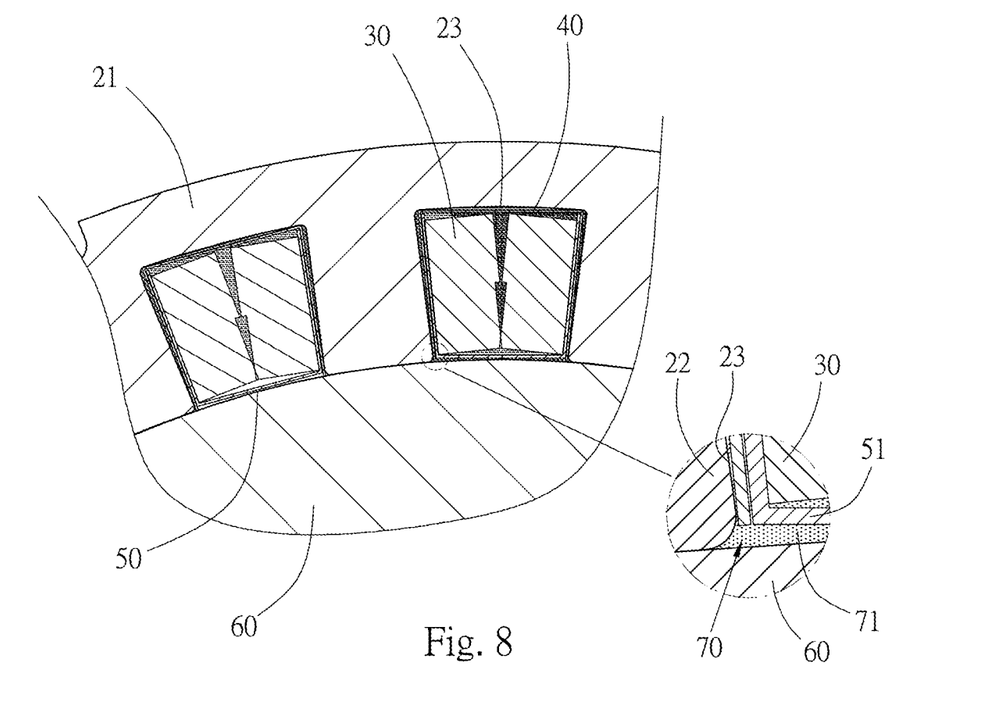
FIG. 8 is a partial sectional view according to the first preferred embodiment of the present invention, and shows a state of using a jig to fill a sealant.

Next, as shown in FIG. 8, a conventional sealant (70) such as epoxy resin is filled in each groove (23) to encapsulate each coil winding (30). Meanwhile, each insulation sheet (51) separates the jig (60) from each coil winding (30) to ensure that after the sealant (70) has been encapsulated, a thickness of an inner layer (71) corresponding to the sealant (70) on one side, close to a curvature center of the yoke portion (21), of each coil winding (30) is greater than or equal to a thickness of the insulation sheet (51) in a radial direction corresponding to the yoke portion (21), so as to ensure that each coil winding (30) can be better encapsulated and protected.

For further description, a thickness of a paper sheet of the first insulation member (40) may be minimized to make maximum use of a groove space to accommodate the coil windings. In addition, the insulation sheet (51) is used to provide insulation and is further used to control the thickness of the inner layer (71). The thickness of the insulation sheet (51) has relatively small impact on a space filling factor. Therefore, the thickness of the insulation sheet (51) may be set according to an actual requirement. For example, the thickness of the insulation sheet (51) may be greater than a thickness of the first insulation member (40).

To further improve the effect of insulation, a third insulation member (80a), (80b) is respectively added in a second preferred embodiment and a third preferred embodiment of the present invention to improve an insulation effect of the coil windings.

Figure 9:
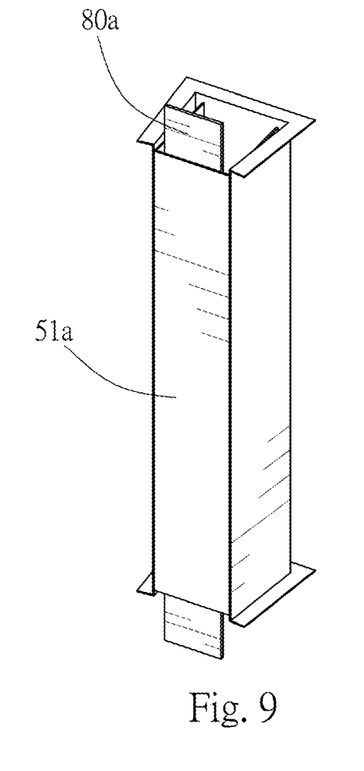
FIG. 9 is a combined perspective view of a first insulation member, a second insulation member, and a third insulation member according to a second preferred embodiment of the present invention.
Figure 10:
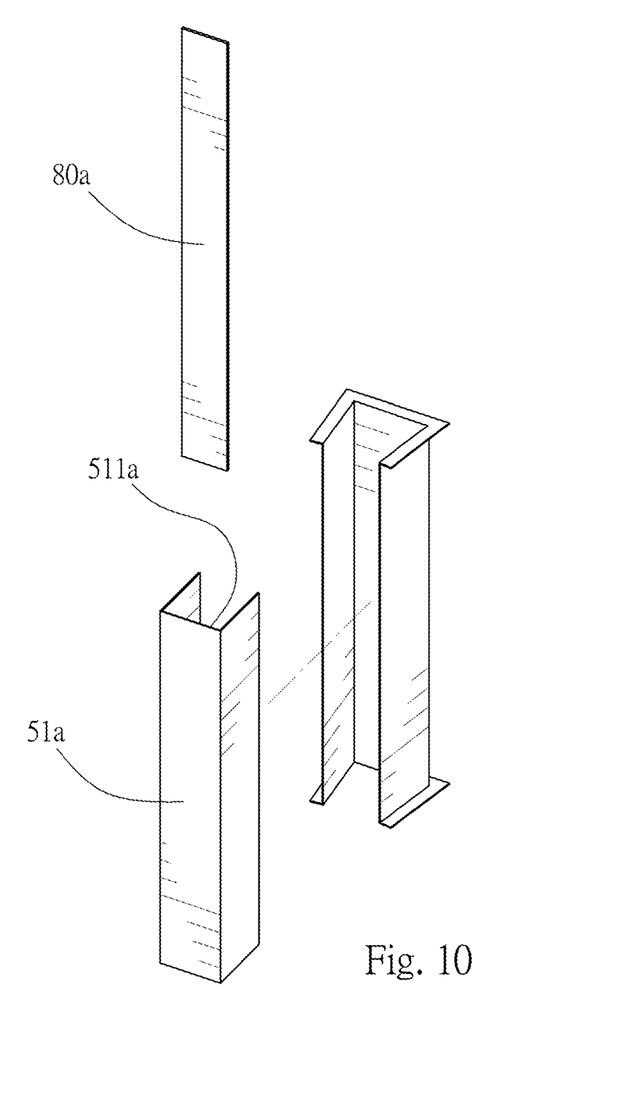
FIG. 10 is an exploded perspective view of a first insulation member, a second insulation member, and a third insulation member according to the second preferred embodiment of the present invention.

As shown in FIG. 9 and FIG. 10, a plurality of third insulation members (80a) that are added in the second preferred embodiment of the present invention are sheet bodies whose lengths are greater than the height of a tooth portion, and are respectively attached to a one-side sheet surface (511a) of each corresponding insulation sheet (51a). In this case, the plurality of third insulation members (80a) are respectively attached to each corresponding coil winding in place of the one-side sheet surface (511a). Meanwhile, two major-axis ends protrude from each tooth portion to provide each coil winding with a larger area of insulation and protection.

Figure 11:
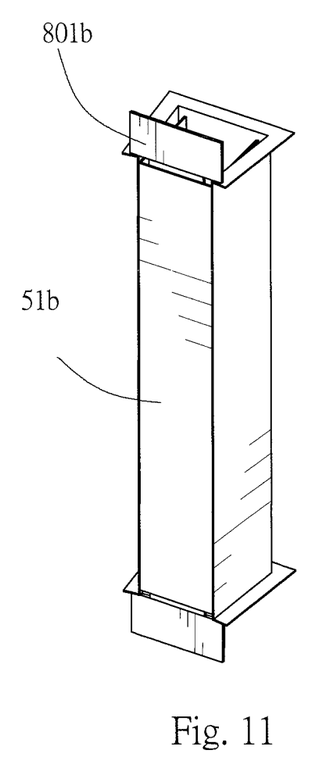
FIG. 11 is a combined perspective view a first insulation member, a second insulation member, and a third insulation member according to a third preferred embodiment of the present invention.
Figure 12:
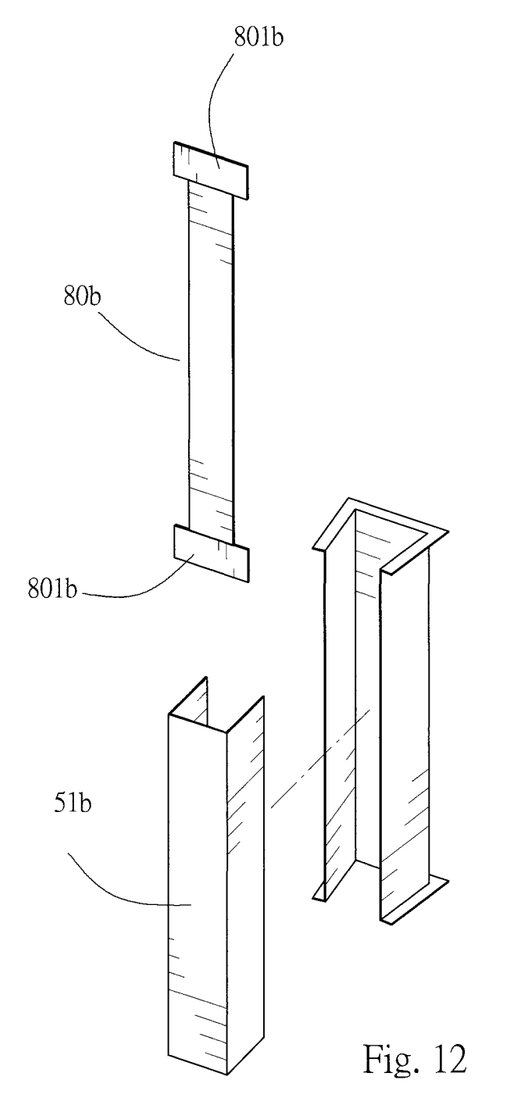
FIG. 12 is an exploded perspective view of a first insulation member, a second insulation member, and a third insulation member according to the third preferred embodiment of the present invention.

As shown in FIG. 11 and FIG. 12, the structure of a plurality of third insulation members (80b) that are added in the third preferred embodiment of the present invention is generally consistent with that in the second preferred embodiment. A difference is that in this embodiment, a sheet body width between two major-axis ends (801b) of each third insulation member (80b) is respectively greater than a sheet body width of each insulation sheet (51b), so as to further improve an insulation effect that can be provided by the coil windings.

REFERENCE NUMERALS (10) coil insulation structure for a rotating machine (20) iron core (21) yoke portion (22) tooth portion (23) groove (30) coil winding (40) first insulation member (50) second insulation member (51) (51a) (51b) insulation sheet (511) (511a) one-side sheet surface (512) opposite-side sheet surface (52) insertion sheet (60) jig (70) sealant (71) inner layer (80a) (80b) third insulation member (801b) two major-axis ends

What is claimed is:

1. A stator, comprising:
    an iron core, having an annular yoke portion, wherein a plurality of tooth portions radially protrude inwards from an inner circumferential surface of the yoke portion, a plurality of grooves are respectively located between adjacent tooth portions, and a shoe portion is not disposed at a free end of each tooth portion;
    a plurality of annular coil windings, respectively inserted over each tooth portion, and located in adjacent grooves;
    a plurality of sheet-shaped first insulation members, respectively located in each groove, and located between each coil winding and the yoke portion and between each coil winding and each tooth portion;
    a sealant, filled in each groove, to encapsulate the coil windings on the iron core;
    a plurality of second insulation members, respectively located on groove opening sides of the grooves, and having a side attached to a side of an adjacent coil winding, each of said second insulation members having an insulation sheet, and two insertion sheets respectively protrude from two sides of the insulation sheet and are inserted in corresponding grooves to be located between the corresponding coil windings and groove walls;
    a thickness of an inner layer of the sealant located on one side, close to a curvature center of the yoke portion, of each coil winding is greater than or equal to an individual thickness of the second insulation member corresponding to the yoke portion in a radial direction; and
    a plurality of sheet-shaped third insulation members, respectively located between each second insulation member and each coil winding.

2. The stator according to claim 1, wherein a sheet body thickness of the insulation sheet is used to determine the thickness of the inner layer.

3. The stator according to claim 1, wherein the thickness of the inner layer is greater than or equal to a sheet body thickness of the insulation sheet.

4. The stator according to claim 1, wherein in an axial direction of the yoke portion, a length of each third insulation member is greater than a height of each tooth portion, and two major-axis ends of each insulation member protrude from each tooth portion.

5. The stator according to claim 4, wherein a sheet body width between two major-axis ends of each third insulation member is greater than a sheet body width of the insulation sheet.

6. The stator according to claim 1, wherein before the sealant is filled for encapsulation, a radial external force is applied to each coil winding via each second insulation member, so that the other side, far away from the curvature center of the yoke portion, of each coil winding displaces towards the inner circumferential surface of the yoke portion to increase a space filling factor.

7. The stator according to claim 6, wherein the radial external force is provided by a jig passing through the iron core.

8. The stator according to claim 7, wherein the jig is column-shaped, and has a circumferential column surface attached to each second insulation member.

* * * * *